(No Model.)
C. V. ROBERTS.
FILTER.
No. 600,651. Patented Mar. 15, 1898.
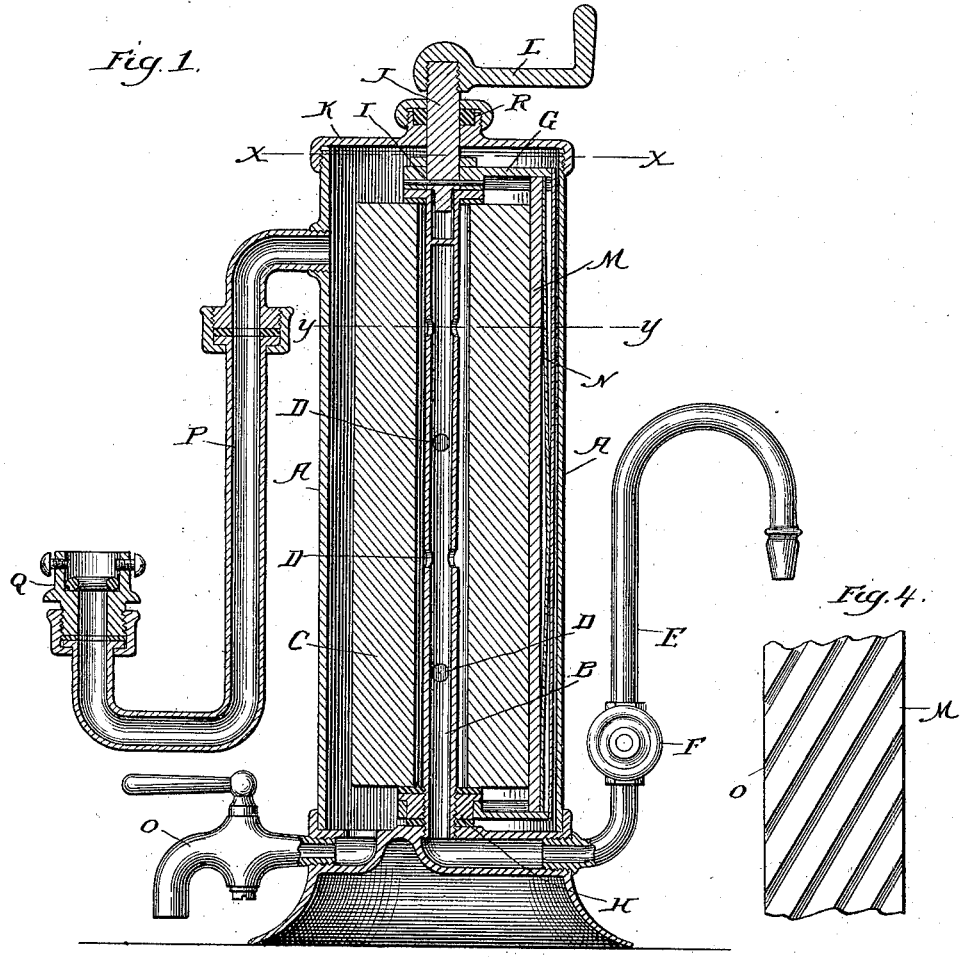
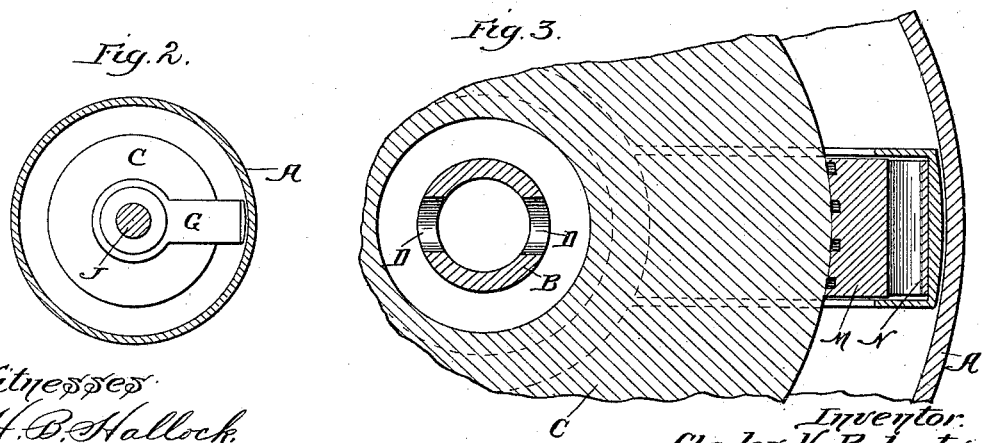
Witnesses:
H. B. Hallock
J. Williamson
Inventor:
Charles V. Roberts
by Geo. H. Holgate
Attorney.

UNITED STATES PATENT OFFICE.

CHARLES V. ROBERTS, OF PHILADELPHIA, PENNSYLVANIA.

FILTER.

SPECIFICATION forming part of Letters Patent No. 600,651, dated March 15, 1898.

Application filed April 7, 1897. Serial No. 631,100. (No model.)

*To all whom it may concern:*

Be it known that I, CHARLES V. ROBERTS, a citizen of the United States, residing at Philadelphia, in the county of Philadelphia and State of Pennsylvania, have invented a certain new and useful Improvement in Filters, of which the following is a specification.

My invention relates to a new and useful improvement in pressure-filters, and has for its object to so construct a device of this description as to thoroughly clean water passing therethrough from all impurities and clarify the same, while at the same time providing ready means for cleaning the accumulations of filtration from the outer surface of the filtering agent and flushing the same from the filter, and also permitting the withdrawing of water from the filter without compelling it to pass through the filtering agent, thus providing for the supplying of water for washing or other purposes where filtration is not needed.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1 is a central vertical section of a filter made in accordance with my improvement; Fig. 2, a section at the line $x\ x$ thereof; Fig. 3, an enlarged detail section at the line $y\ y$ of Fig. 1, and Fig. 4 a detail showing diagonal grooves in scraper.

In carrying out my invention as here embodied I provide a casing A, preferably of cylindrical form, and secure therein the tube B by threading or otherwise, and around this tube is placed the filtering agent C, here shown as a cylindrical porous stone through which the water may be forced to percolate by pressure. The hole through the center of this stone is of larger diameter than the tube which it surrounds, and therefore leaves the space in which the filtered water will accumulate, and holes D are provided in the tube for the passage of this water to the interior of said tube and from thence to the gooseneck E, which is provided with a suitable valve F for controlling the outflow of said water.

A yoke G extends around the filtering agent and is journaled below the same upon a bushing, as indicated at H, and is secured at I to the spindle J, which extends through the cap K of the casing, and has secured upon its upper end the crank L. This arrangement permits of the revolving of the yoke by means of the crank for the purpose next explained.

A scraper M is located within the yoke and adapted to bear against the filtering agent, and is backed up by a plate-spring N, the tendency of which is to hold said scraper firmly against the filtering agent in order that when the yoke is revolved, as just described, the scraper will be caused to remove the accumulations of filtration from the outer surface of the filtering agent, after which they will be precipitated to the bottom of the casing, from whence they may be withdrawn through the faucet O, and this action is facilitated by the diagonal grooves, formed within the scraper.

Water is admitted through the pipe P, which is provided with a suitable coupling Q for connection to the water-supply, so that when the faucet O is opened and water permitted to flow through the pipe P through the casing it will be projected against the filtering agent, thus further cleansing the same during the revolving of the scraper thereagainst and causing all of the accumulations to pass from the casing to the faucet. Access may be had to the interior of the casing by the unthreading of the cap K, and to prevent leakage a stuffing-gland R surrounds the spindle J and is provided with a suitable packing.

From this it will be seen that filtered water may be drawn through the gooseneck by the proper manipulation of the valve F, while water for uses not needing filtration may be drawn through the faucet O, and when the filtering agent has become partly clogged from the accumulations which are retained thereon during the percolations of the water therethrough said accumulations may be quickly removed and flushed from the filter.

Having thus fully described my invention, what is claimed as new and useful is—

1. A filter provided with a stationary or fixed casing, and a tubular filtering-body in combination with a revoluble frame surrounding said body and provided with a laterally-movable cleaner, recessed arms at both ends of said frame, to which said cleaner is connected, and the cleaner engaging the periphery of the filtering-body substantially as described.

2. A filter provided with a stationary or fixed casing and a tubular filtering-body in combination with a revoluble frame surrounding said body and provided with a laterally-movable cleaner, recessed arms at both ends of said frame, and springs for holding the cleaner in contact with the periphery of the filtering-body, substantially as described.

3. In combination, a casing, a tube located therein, said tube having holes communicating with its interior, a filtering agent surrounding said tube, means for admitting water to the casing, means for drawing water therefrom without passing through the filtering agent, means for drawing water from the casing through the filtering agent, a scraper bearing against the outer surface of the filtering agent, a yoke for holding said scraper, a spring interposed between said yoke and the scraper so as to cause the latter to bear against the filtering agent with a constant pressure, and a crank for revolving said yoke, as specified.

4. In combination, a casing, a tube located therein, said tube having holes formed therethrough, a gooseneck communicating with the interior of said tube, a filtering agent of cylindrical form surrounding said tube, a scraper fitted against the outer surface of said filtering agent, a yoke in which said scraper is fitted, a plate-spring so arranged as to cause said scraper to bear against the filtering agent with a constant pressure, a spindle to which said yoke is secured, a crank for revolving said spindle, a pipe leading to the upper portion of the casing for supplying water thereto, and a faucet O for withdrawing water from the casing without causing it to pass through the filtering agent, as specified.

In testimony whereof I have hereunto affixed my signature in the presence of two subscribing witnesses.

CHARLES V. ROBERTS.

Witnesses:
  S. S. WILLIAMSON,
  MARK BUFORD.